UNITED STATES PATENT OFFICE.

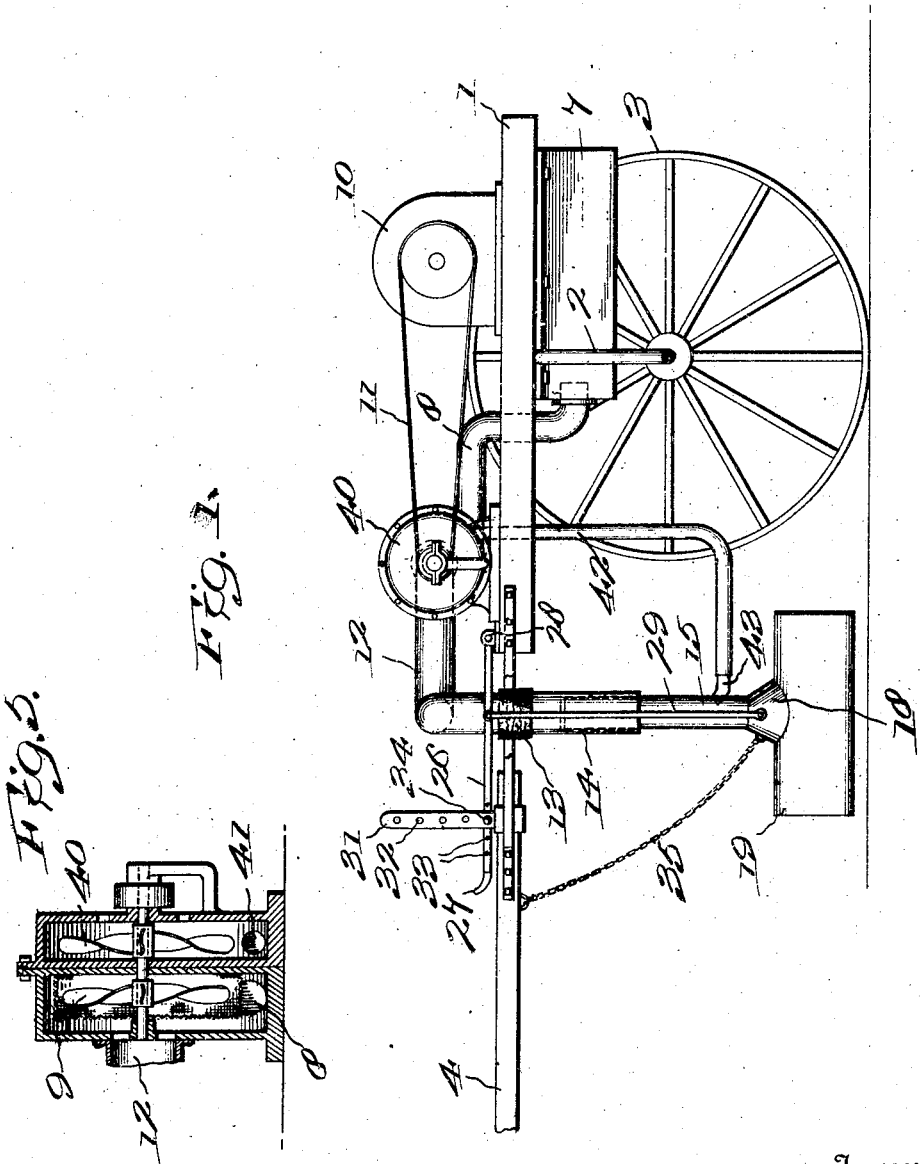

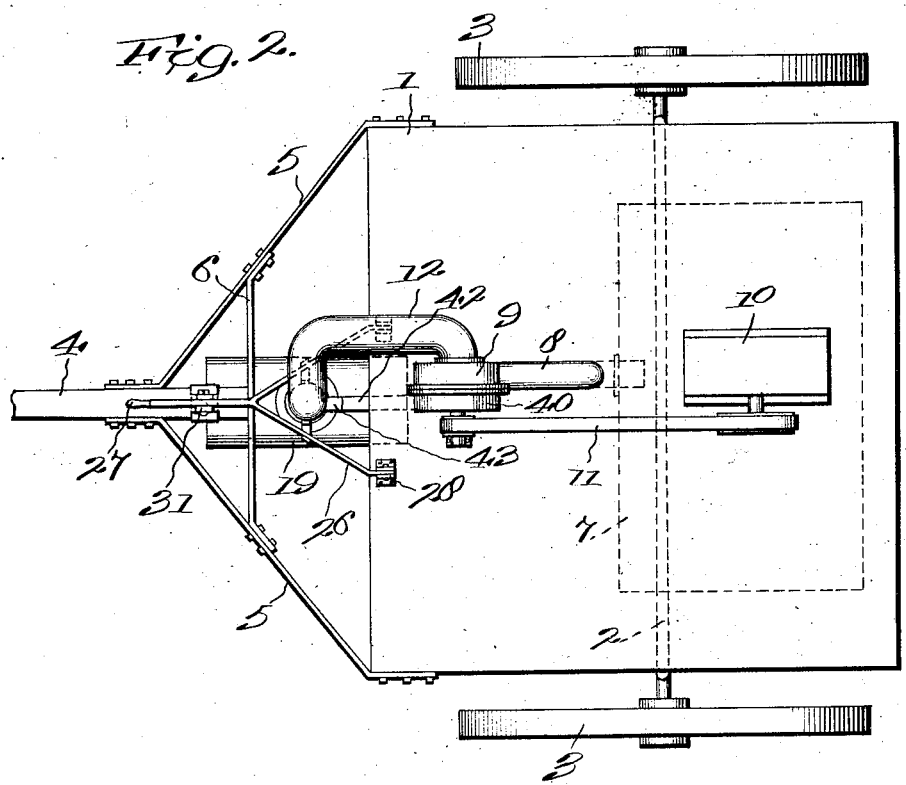

DANIEL H. BRITTON AND DANIEL H. BRITTON, JR., OF NATCHEZ, MISSISSIPPI.

APPARATUS FOR DESTROYING BOLL-WEEVIL.

1,146,687.  Specification of Letters Patent.  Patented July 13, 1915.

Application filed September 10, 1914. Serial No. 861,084.

*To all whom it may concern:*

Be it known that we, DANIEL H. BRITTON and DANIEL H. BRITTON, Jr., citizens of the United States, residing at Natchez, in the county of Adams and State of Mississippi, have invented certain new and useful Improvements in Apparatus for Destroying Boll-Weevil; and we do hereby declare the following to be a full, clear, and exact description of the invention, such as will enable others skilled in the art to which it appertains to make and use the same.

The present invention relates to apparatus for destroying boll weevil, and consists more particularly in improvements in apparatus of this character which will effectually dislodge weevil, worms, or other insects, or infected forms from cotton or other plants, and collect the same in a receptacle carried by the apparatus, from which they may be subsequently removed and destroyed.

It is an object of the present invention to provide an apparatus for destroying boll weevil, wherein a fan blower, or other suction-producing device, is connected by a pipe arranged to travel in proximity to the cotton or other plants and remove weevil, or other insects, therefrom and deposit the same in a receptacle as the apparatus proceeds.

It is another object of the present invention to provide an apparatus for destroying boll weevil, wherein an arrangement of brushes is associated with the suction pipe of the apparatus whereby the brushes are adapted to encounter the stems and bolls of the cotton plants to effectively dislodge weevil and infected forms therefrom, and prevent the same from clinging to the plants so as to baffle the suction through which they are removed and collected to be subsequently destroyed.

It is a further object of the present invention to provide an apparatus for destroying boll weevil, which will be equipped with a mechanism for adjusting the suction pipe to accommodate plants of varying heights; and such mechanism consists of few and simple parts, readily assembled and disassembled, and which, when in position, will be capable of ready and convenient adjustment.

Reference will be had to the accompanying drawings, in which similar reference symbols indicate corresponding parts throughout the several views.

Figure 1 is a side elevational view of an apparatus constructed in accordance with the present invention; Fig. 2 is a top plan view of the same; Fig. 3 is a sectional view of the suction pipe and hood, and of the mechanism for adjusting the same; Fig. 4 is a perspective view of the hood carried by the lower end of the suction pipe; and Fig. 5 is a vertical sectional view of the suction and draft-producing apparatus.

Referring more particularly to the drawings, 1 indicates a platform mounted on an arched axle 2, arranged to straddle the rows of cotton plants, and supported on ground wheels 3.

The apparatus may be propelled through its own power, but is preferably arranged to be drawn along by draft animals hitched to a tongue or draft beam 4; the latter being connected to the platform 1 by metal straps 5 braced by a cross bar 6 against which the end of the tongue is arranged to abut.

Bolted, or otherwise removably or fixedly secured, to the underside of the platform 1 is a receptacle 7, into which the weevil or other insects, or infected forms are arranged to be delivered as the apparatus proceeds, and from which the same may be removed from time to time and destroyed in any suitable manner. The receptacle 7 is connected by a pipe 8 to the exhaust of a fan blower, or other suitable suction-producing device, 9, the same being mounted upon the platform 1 and arranged to be driven from a motor 10, of any desired type, through the belt and pulley or other connection 11. As advantageously disclosed in Fig. 5, the fan blower 9 is inclosed in a reticulate covering for preventing the weevil and other foreign matter from coming into active contact with the blades of the fan blower to thereby injure the same or clog the bearings thereof. The eye of the fan blower 9 is connected by a pipe 12, which may be suitably mounted upon the platform in any convenient and desired manner, and which is directed forwardly and downwardly in front of the platform 1, where the same is connected through a flexible joint 13 to one section 14 of a pair of telescoping members, the other section 15 of which is of lesser diameter and slides within the upper section 14. The flexible connection 13 is preferably constructed of leather, riveted, as more particularly shown in Fig. 3, to the adjacent pipe ends, and the same permits the telescoping members 14 and 15 and their associated parts to be moved in a forward or rearward direction with respect to the apparatus in encountering obstacles which would otherwise result in breakage to the parts.

The lower telescoping section 15 is provided at its upper end with an out-turned annular flange 16, arranged to encounter and coöperate with an inturned annular flange 17 of the lower end of the upper pipe section 14. It will be understood that the flanges 16 and 17 prevent withdrawal, or accidental removal, of the telescoping sections 14 and 15, and further limit the descent of the lower section 15 so as to prevent any liability of the hood from coming in contact with the ground.

The lower end of the pipe section 14 is provided with a flaring mouth 18, to which is connected a hood 19, more particularly illustrated in Fig. 4 to be constructed of sheet metal bent substantially semi-circularly and having its free ends turned radially inward to provide flanges 20 and 21. The flanges 20 and 21 are arranged to coöperate with metal or other strips 22 and 23 for securing thereto the bristles 24 and 25 which constitute the brush. The bristles 24 and 25 are preferably of broom corn straw, which is pliable and has been found to be particularly adapted for the purpose. As advantageously disclosed in Figs. 3 and 4, the bristles 24 and 25 of the brush project in a horizontal plane and are spaced apart at their inner ends to provide a longitudinal channel for receiving the stems and bolls of the cotton or other plants.

The lower pipe section 15 may be moved and held in any desired adjusted position by any suitable mechanism, and for purposes of illustration we have disclosed the form of mechanism used by us, which consists in a bifurcated lever 26 provided at its upper free end with a manipulating handle 27, and each fork of the lever 26 is pivoted in pairs of ears 28 mounted on the platform 1 to either side of the pipe 12. Each fork of the lever 26 is connected by a link or rod 29 with a pintle 30 journaled in the flaring mouth 18 of the pipe section 15. The lever 26 is arranged to be raised and lowered about the ears 28 as a center, and the same moves between a pair of guides 31 erected on the draft beam 4 and provided with a series of horizontally-registering perforations 32, coöperating with a similar series of perforations 33 produced in the lever 26.

A bolt, cotter, or other device 34 is arranged to be passed through the alining perforations 32 and 33, whereby the lever 26 is effectively held in any adjusted position. It will be understood that in raising the lever 26 through its manipulating handle 27 the pipe section 15, carrying the hood 19, is raised by means of the links 29 and pintle 30. In this manner the hood 19 can be supported at any suitable elevation corresponding to that of the height of the plants treated. A flexible chain 35 is arranged to be connected between the tongue 4 and the flaring mouth 18 of the lower pipe section 15, for limiting the rearward movement of the associated parts through the flexible connection 13.

In operation the apparatus is propelled along through its own power, or drawn along by draft animals hitched to the tongue 4, and walking in the paths to either side of the rows of plants. The motor 10 is, during the progress of the apparatus, in operation to continuously drive the fan blower 9, whereby suction is created in the pipe 12 and the associated pipe sections 14 and 15 communicating with the hood 19. As the hood 19 passes successively over the plants, the weevil, worms or other insects, or infected forms, are brought under the influence of the suction thus created and are thereby drawn up through the pipes to the blower 9, whence they are discharged through the exhaust pipe 8 into the receptacle 7. The bristles 24 and 25 of the brush sweep over the stems and bolls of the plants and are effective to dislodge any insects that cling to the same and resist the action of the suction.

In passing from fields of one growth to those of a higher growth, the driver, who may be seated at any convenient location on the platform 1, removes the bolt 34 and moves the lever 26 to raise the hood 19 through the associated connections to the desired elevation. The bolt 34 is thereupon inserted through the perforations 32 alining with that of the perforation 33 of the lever 26 when the adjustment is complete and the apparatus ready to proceed.

In the event of encountering obstacles, such as stones, clods of earth, etc., the hood 19 is permitted to be moved rearwardly to clear the same through the flexible connection 13, such movement being, however, limited by the chain 35 which latter assists to maintain the hood and telescoping pipe sections in their proper vertical position, and prevents the same from being displaced by the cotton or other plants.

It has been found desirable to provide a blast-producing device to assist the suction of the fan-blower 9; and to this end an auxiliary fan 40 is mounted with the fan-blower 9 on a common shaft driven from the engine 10 as illustrated in Fig. 5. The eye of the auxiliary fan 40 is open to the atmosphere, as shown, while the exhaust 41 is connected by a flexible or other tubing 42 to a nozzle 43 inserted into the section 15 of the telescoping members. The fan 40 draws in air from the atmosphere and drives the same out through the exhaust and into the tubing 42 to the nozzle 43, whence the air is discharged into the telescoping pipe and assists the blower 9 to create a greater suction in the hood 19.

We have illustrated and described preferred and satisfactory constructions, but obviously changes could be made in the herein described apparatus which could be used without departing from the spirit of our invention.

We claim:—

1. In apparatus of the character described, the combination of a wheeled vehicle, a suction device mounted on said vehicle, a receiver connected to the exhaust of said suction device, a hood supported from said vehicle and arranged to successively envelop the plants, brushes mounted in said hood arranged to sweep the plants, and connections between said hood and said suction device for conveying the insects to said receiver, substantially as described.

2. In an apparatus of the character described, the combination of a wheeled vehicle, a suction device mounted on said vehicle, a receiver connected to the exhaust of said suction device, a hood supported from said vehicle and constructed of sheet metal bent substantially semi-cylindrically and having its longitudinal edges inturned to provide a pair of oppositely-disposed flanges, brush bristles secured to said flanges and arranged to sweep the plants as the hood proceeds and envelops the same, and connections between said hood and said suction device for conveying the insects to said receiver, substantially as described.

3. In an apparatus of the character described, the combination of a wheeled vehicle, a suction device mounted on said vehicle, a receiver connected to the exhaust of said suction device, a hood supported from said vehicle and constructed of sheet metal bent substantially semi-cylindrically and provided with inturned edges to provide oppositely-disposed flanges, bristles secured to the oppositely-disposed flanges and arranged to sweep the plants as the vehicle proceeds, connections between said hood and suction device for conveying the insects to said receiver, a fan blower mounted on said vehicle, a nozzle mounted in said connections and arranged in communication with said fan blower to deliver a blast in the connections to assist the suction in conveying the insects, substantially as described.

In testimony whereof, we affix our signatures in presence of two witnesses.

DANIEL H. BRITTON.
DANIEL H. BRITTON, Jr.

Witnesses:
H. H. HUDSON,
L. VALENTINE.